United States Patent
Pčolka et al.

(10) Patent No.: US 12,000,348 B2
(45) Date of Patent: Jun. 4, 2024

(54) HEALTH CONSCIOUS CONTROLLER

(71) Applicant: Garrett Transportation I Inc., Torrance, CA (US)

(72) Inventors: Matej Pčolka, Prague (CZ); David Hriadel, Prague (CZ); Martin Procházka, Prague (CZ)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 18/072,279

(22) Filed: Nov. 30, 2022

(65) Prior Publication Data
US 2023/0091698 A1    Mar. 23, 2023

Related U.S. Application Data

(62) Division of application No. 17/008,076, filed on Aug. 31, 2020, now Pat. No. 11,530,656.

(51) Int. Cl.
*F02D 41/00* (2006.01)
*F02B 37/04* (2006.01)
(Continued)

(52) U.S. Cl.
CPC .......... *F02D 41/0007* (2013.01); *F02B 37/04* (2013.01); *F02B 37/14* (2013.01);
(Continued)

(58) Field of Classification Search
CPC ............ F02D 41/0007; F02D 41/1406; F02D 41/1401; F02D 41/22; F02D 2041/1433;
(Continued)

(56) References Cited

U.S. PATENT DOCUMENTS 7,392,713 B2    7/2008    Barkhoudarian
7,805,940 B2    10/2010   Burkhardt et al.
(Continued)

FOREIGN PATENT DOCUMENTS

EP    3065008 A1    9/2016

OTHER PUBLICATIONS

Moura et al., "Techniques for Battery Health Conscious Power Management via Electrochemical Modeling and Optimal Control," University of Michigan, 152 pages, 2011.
(Continued)

*Primary Examiner* — Loren C Edwards
(74) *Attorney, Agent, or Firm* — Seager, Tufte & Wickhem, LLP

(57) ABSTRACT

New and/or alternative approaches to physical plant performance control that can account for the health of the physical plant. In one example, a control algorithm is enhanced by inclusion of terms related to optimized performance and terms related to physical plant health. In another example, a performance optimized control solution is determined, a maximum allowed deviation is defined, and a final solution for physical plant control is determined taking into account health factors to minimize health impacts within the maximum allowed deviation from optimized performance, using for example a two-stage analysis. Another example uses a two level system with a low level controller and a supervisory controller, in which the supervisory controller observes health impacts of ongoing operations managed by the low level controller, and modifies one or more parameters used by the low level controller.

10 Claims, 10 Drawing Sheets

(51) Int. Cl.
  *F02B 37/14*    (2006.01)
  *F02D 23/00*    (2006.01)
  *F02D 41/14*    (2006.01)
  *F02D 41/22*    (2006.01)
  *G05B 13/02*    (2006.01)
  *G05B 19/418*   (2006.01)

(52) U.S. Cl.
  CPC .......... *F02D 23/00* (2013.01); *F02D 41/1401* (2013.01); *F02D 41/22* (2013.01); *G05B 13/02* (2013.01); *G05B 13/0245* (2013.01); *G05B 19/4184* (2013.01)

(58) Field of Classification Search
  CPC ....... F02D 2041/1412; F02D 2041/141; F02B 2039/162; F02B 2039/164; F02B 2039/166; F02B 2039/168; F02B 37/04; F02B 37/12; F02B 37/14; F02B 77/08; F02B 77/083; G05B 13/02–048; G05B 19/4184
  See application file for complete search history.

(56) References Cited

U.S. PATENT DOCUMENTS

| | | | |
|---|---|---|---|
| 9,014,945 | B2 | 4/2015 | Abrol et al. |
| 9,378,594 | B2 | 6/2016 | Wong et al. |
| 9,677,476 | B2 | 6/2017 | Smith et al. |
| 10,277,041 | B2 | 4/2019 | Zane et al. |
| 2006/0137340 | A1 | 6/2006 | Stewart |
| 2006/0287795 | A1* | 12/2006 | Samad .................. F02D 41/266 701/54 |
| 2007/0250215 | A1 | 10/2007 | Jia et al. |
| 2013/0046507 | A1 | 2/2013 | Vega Paez et al. |
| 2013/0255220 | A1 | 10/2013 | Mathews, Jr. et al. |
| 2015/0083096 | A1 | 3/2015 | Zagone et al. |
| 2016/0076438 | A1 | 3/2016 | Tabata et al. |
| 2016/0215685 | A1 | 7/2016 | Flavin et al. |
| 2016/0216699 | A1 | 7/2016 | Pekar et al. |
| 2016/0237927 | A1 | 8/2016 | Long et al. |
| 2016/0265468 | A1 | 9/2016 | Takayanagi et al. |
| 2016/0336765 | A1 | 11/2016 | Trimboli et al. |
| 2017/0044971 | A1 | 2/2017 | Racca |
| 2017/0096952 | A1 | 4/2017 | Yu et al. |
| 2017/0152799 | A1 | 6/2017 | Lee et al. |
| 2017/0314481 | A1 | 11/2017 | Karunaratne et al. |
| 2018/0051638 | A1 | 2/2018 | Wang et al. |
| 2018/0334954 | A1 | 11/2018 | Banker et al. |
| 2018/0347408 | A1 | 12/2018 | Collins et al. |
| 2019/0195526 | A1 | 6/2019 | Drees et al. |

OTHER PUBLICATIONS

Extended European Search Report for EP Application No. 21185443.5 issued Mar. 14, 2022, 12 pages.

* cited by examiner

| Controller minimizing $J_{HC}$ | Two-stage controller 502 |
|---|---|
| | Stage I. |
| $A_1^* = \dfrac{R+D}{2} = \dfrac{5+2}{2} = 3.5$ | $A_{2,I}^* = R + D = 5 + 2 = 7$ |
| $Y(A_1^*) = A_1^* - D = 3.5 - 2$ | Stage II. |
| $= 1.5$ | $J_{MPC}^* = (A_{2,I}^*)^2 - 2A_{2,I}^*(R+D) + R^2 + 2RD + D^2 = 0$ |
| $J_{MPC}(A_1^*) = (R-Y)^2$ | Cost function degradation constraints: |
| $= (5 - 1.5)^2 = (3.5)^2 = \mathbf{12.25}$ | $J_{MPC}(A) \leq J_{MPC}^* + \Delta J \rightarrow 3.5 \leq A \leq 10.5$ |
| $HD(A_1^*) = (A_1^*)^2 = 3.5^2$ | According to Formula Set 1.b: |
| $= \mathbf{12.25}$ | $A_{2,II}^* = R + D - \sqrt{J_{MPC}^* + \Delta J} = 7 + 2 - \sqrt{12.25} = 3.5$ |
| | $Y(A_{2,II}^*) = A_{2,II}^* - D = 3.5 - 2 = 1.5$ |
| | $J_{MPC}(A_{2,II}^*) = (R-Y)^2 = (5-1.5)^2 = (3.5)^2$ |
| | $= \mathbf{12.25}$ |
| | $HD(A_{2,II}^*) = (A_{2,II}^*)^2 = 3.5^2 = \mathbf{12.25}$ |

Fig. 8

| Controller minimizing $J_{HC}$ | Two-stage controller     512 |
|---|---|
| $A_1^* = \dfrac{R+D}{2} = \dfrac{5-7}{2} = -1$ | Stage I. $\quad A_{2,I}^* = R + D = 5 - 7 = -2$ |
| $Y(A_1^*) = A_1^* - D = -1 + 7 = 6$ | Stage II. |
| $J_{MPC}(A_1^*) = (R-Y)^2 = (5-6)^2$ $= (-1)^2 = 1$ | $J_{MPC}^* = \left(A_{2,I}^*\right)^2 - 2A_{2,I}^*(R+D) + R^2 + 2RD + D^2 = 0$ |
| $HD(A_1^*) = (A_1^*)^2 = (-1)^2 = 1$ | Cost function degradation constraints: |
| | $J_{MPC}(A) \leq J_{MPC}^* + \Delta J \;\rightarrow\; -5.5 \leq A \leq 1.5$ |
| | According to Formula Set 1.a: |
| | $A_{2,II}^* = 0$ |
| | $Y(A_{2,II}^*) = A_{2,II}^* - D = 0 + 7 = 7$ |
| | $J_{MPC}(A_{2,II}^*) = (R-Y)^2 = (5-7)^2 = (2)^2 = 4$ |
| | $HD(A_{2,II}^*) = \left(A_{2,II}^*\right)^2 = 0^2 = 0$ |

| Controller minimizing $J_{HC}$ | Two-stage controller 522 |
|---|---|
| $A_1^* = \dfrac{R+D}{2} = \dfrac{5-20}{2} = -7.5$ | Stage I. $A_{2,I}^* = R + D = 5 - 20 = -15$ |
| $Y(A_1^*) = A_1^* - D = -7.5 + 20 = 12.5$ | Stage II. $J_{MPC}^* = (A_{2,I}^*)^2 - 2A_{2,I}^*(R+D) + R^2 + 2RD + D^2$ $= 0$ |
| $J_{MPC}(A_1^*) = (R-Y)^2 = (5-12.5)^2$ $= (-7.5)^2 = \mathbf{56.25}$ | Cost function degradation constraints: $J_{MPC}(A) \leq J_{MPC}^* + \Delta J \rightarrow$ $-18.5 \leq A \leq -11.5$ |
| $HD(A_1^*) = (A_1^*)^2 = (-7.5)^2 = \mathbf{56.25}$ | According to Formula Set 1.c $A_{2,II}^* = -11.5$ |
| | $Y(A_{2,II}^*) = A_{2,II}^* - D = -11.5 + 20 = 8.5$ |
| | $J_{MPC}(A_{2,II}^*) = (R-Y)^2 = (5-7)^2 = (-3.5)^2$ $= \mathbf{12.25}$ |
| | $HD(A_{2,II}^*) = (A_{2,II}^*)^2 = (-11.5)^2 = \mathbf{132.25}$ |
| 520 | |

Fig. 10

HEALTH CONSCIOUS CONTROLLER

CROSS-REFERENCE TO RELATED APPLICATIONS

This application is a divisional of U.S. patent application Ser. No. 17/008,706 filed Aug. 31, 2020, titled "HEALTH CONSCIOUS CONTROLLER", the contents of which are hereby incorporated herein by reference in its entirety for any and all purposes.

FIELD

Controllers and configurations for such controllers.

BACKGROUND

Modern automotive control generally makes use of a vehicle processing unit that controls a number of parameters to enhance engine performance. A variety of different control methodologies may be used, such as Model predictive control (MPC). MPC enables the user to formulate the control performance requirements (setpoint tracking quality, energy consumption and others) and technical/operational restrictions (physical constraints for valve positions and actuator values and others) into a form of objective function and accompanying constraints for the optimized variables. In automotive, these optimized variables usually correspond to manipulated variables, such as torques, normalized braking forces, valve openings etc. Using the internal model of the controlled system, the optimizer (optimization routine) finds the optimal values of the optimized variables over the specified prediction horizon such that the cost function is minimized, and the constraints are satisfied.

Predictive maintenance criterion may be used to generate system warnings to prevent failure. FIG. 1 shows a prior art approach. For a given component of a system, such as a turbocharger, one or more parameters (and links between such parameters) may be monitored 10 to determine whether and when failure is likely. When the measured variable satisfies faultless case conditions 12, the process returns to monitoring 10 until a next iteration. Iterations may be performed at a desired/set frequency (such as every second, or longer or shorter time period). If the measured variable exceeds fault boundaries, a predictive maintenance approach will determine when the degradation of the underlying component has reached a point where failure is imminent, and proceeds from block 12 to block 14, where the component at issues is identified, and a flag is set at 16 for that component. The flag may result in issuance of an alert to the user, for example, and may be set and recorded for use in maintenance operations. For example, the pressure into, and out of, a turbocharger compressor may be monitored in relation to the speed of the compressor; the amount of pressure increase at a given speed can be modeled to determine whether the operation of the compressor is degrading to a point where a failure is likely to occur in a foreseeable timeline. While predictive maintenance is useful to avoid system performance degradation as well as catastrophic failure, it does not extend the life of the components of the system between maintenance processes. What is needed then is an approach that will extend component life, a consideration referred to as "health optimization" herein.

Performance-focused control methods can under certain conditions accelerate the deterioration of health of system components. For example, a turbocharger that is operated to maintain a boost pressure setpoint may be optimized for precise reference tracking. When input conditions to the system change, the setpoint maintenance may call for significant and fast changes to the compressor wheel speed. However, large changes to compressor wheel speed are known to contribute to low cycle fatigue of the compressor wheel structure. Thus, performance optimization can compete with health optimization. New and alternative methods and systems adapted to balance these potentially competing health and performance goals are desired.

Overview

Certain performance metrics of a system (whether automotive or otherwise) are considered likely to increase the rate of component degradation. For example, the turbocharger compressor may be operable within a set of compressor speeds and/or pressure in/out parameters, but within that operating range, some combinations of parameters can accelerate degradation. Operating the compressor at a high speed for a prolonged period, for example, can increase local heating and accelerate degradation. The present inventors have recognized that a problem to be solved is the need to adjust performance parameters to avoid such health degrading conditions, which may serve the useful purpose of extending component useful life.

A first illustrative, non-limiting example takes the form of a configurable controller for controlling a physical plant having associated therewith a plurality of actuators for controlling operation of the physical plant and a plurality of sensors for observing a plurality of characteristics of the physical plant operations, the configurable controller comprising: a state observer configured to capture the current state of the physical plant by communication with the plurality of sensors; and an optimizer configured to optimize behavior of the physical plant using at least the actuators; wherein the optimizer is operable using at least one first term associated with optimized performance of the physical plant based on the current state of the physical plant, and at least one second term associated with health degradation of one or more components of the physical plant, and the optimizer operates to direct use of parameters in the actuators to minimize the sum of the first and second terms.

Additionally or alternatively, the first and second terms each comprise a weighting value.

Additionally or alternatively, the at least one second term is calculated in response to, and changes with, history of use of the actuators in the physical plant.

Additionally or alternatively, the history of use is tracked by the state observer.

Additionally or alternatively, the history of use is tracked by a health monitor, which in turn is operably coupled to the optimizer.

Additionally or alternatively, the optimizer generates a plurality of outputs to control the plurality of actuators to operate the physical plant.

Additionally or alternatively, the optimizer is configured to use an optimization-based control method, such as model predictive control (MPC).

A second illustrative, non-limiting example takes the form of a configurable controller for controlling a physical plant having associated therewith a plurality of actuators for controlling operation of the physical plant and a plurality of sensors for observing a plurality of characteristics of the physical plant operations, the configurable controller comprising: a state observer configured to capture the current state of the physical plant; and an optimizer configured to optimize behavior of the physical plant using at least the actuators; wherein the optimizer is configured to perform a two stage procedure for determining outputs for controlling the actuators including: in a first stage, performing an optimization routine resulting in a first configuration of actuator settings directed to optimal performance in view of the current state of the physical plant; and in a second stage, defining a maximum deviation from optimal performance identified in the first stage, and identifying a second configuration of actuator settings that minimizes health degradation without causing performance to deviate by more than the maximum deviation from the optimal performance; and wherein the optimizer is then configured to implement the second configuration of actuator settings.

Additionally or alternatively, the maximum deviation is determined by reference to each of a plurality of sub-objectives of the performance optimization.

Additionally or alternatively, the maximum deviation is determined by reference to a total overall performance.

Additionally or alternatively, the optimizer is configured to perform the second stage by calculating one first term associated with optimized performance of the physical plant based on the current state of the physical plant, and at least one second term associated with health degradation of one or more components of the physical plant, and minimizing the sum of the first and second terms within the maximum deviation.

Additionally or alternatively, at least one second term is calculated in response to and changes with history of use of the physical plant.

Additionally or alternatively, the history of use is tracked by the state observer.

Additionally or alternatively, the history of use is tracked by a health monitor, which in turn is operably coupled to the optimizer.

Additionally or alternatively, the optimizer generates a plurality of outputs to control the plurality of actuators to operate the physical plant, wherein a first output of the plurality of outputs controls an actuator for a turbocharger waste gate (WG), and a second output of the plurality of outputs controls an actuator for a turbocharger recirculation valve (RCV), and the at least one second term comprises a WG term and an RCV term, and the configurable controller changes at least one of the WG term and RCV term in response to history of actuation of the WG and RCV.

A third illustrative, non-limiting example takes the form of a configurable controller for controlling a physical plant having associated therewith a plurality of actuators for controlling operation of the physical plant and a plurality of sensors for observing a plurality of characteristics of the physical plant operations, the configurable controller comprising: a state observer configured to capture the current state of the physical plant; and a low level controller configured to control behavior of the physical plant using at least the actuators; a supervisory controller operably coupled to the state observer and the low level controller; wherein the low level controller is configured to use a plurality of control values for controlling behavior of the physical plant; wherein the supervisory controller is configured to monitor health effects of use of the physical plant as the low level controller controls behavior thereof and identify a health impact caused by the behavior of the physical plant and, in response thereto, to modify one or more of the plurality of control values used by the low level controller, in order to reduce health impact; and wherein the low level controller is further adapted to use the modified one or more of the plurality of control values to control the physical plant.

Additionally or alternatively, the low level controller is configured to use an optimization-based control method, and the one or more control coefficients or weighting values are implemented in the MPC by the low level controller to control the physical plant.

Additionally or alternatively, the low level controller is configured to use a setpoint-based control method, and at least one of the coefficients or weighting values is a setpoint implemented by the low level controller to control the physical plant.

Additionally or alternatively, the supervisory controller is configured with at least first and second sets of control values for use by the low level controller, and the supervisory controller is configured to operate as follows: for a first period of time, instructing the low level controller to implement the first set of control values, and observing a first health impact associated with the first set of control values; for a second period of time, instructing the low level controller to implement the second set of control values, and observing a second health impact associated with the second set of control values; determining which of the first and second health impacts is lesser; and for a third period of time occurring after the first and second periods of time, instructing the low level controller to use whichever of the first and second sets of control values has a lesser health impact.

Additionally or alternatively, the supervisory controller is configured with at least first and second sets of control values for use by the low level controller, and the supervisory controller is configured to operate as follows: instructing the low level controller to implement the first set of control values; observing a first health impact associated with the first set of control values; determining whether the first health impact exceeds a threshold; and upon the first health impact exceeding the threshold, instructing the low level controller to implement the second set of control values.

Yet another illustrative, non-limiting example takes the form of a method of operation in a configurable controller for controlling a physical plant having associated therewith a plurality of actuators for controlling operation of the physical plant and a plurality of sensors for observing a plurality of characteristics of the physical plant operations, the method comprising: a state observer capturing a current state of the physical plant by communication with the plurality of sensors; and an optimizer determining a performance solution for the physical plant using at least one first term associated with optimized performance of the physical plant based on the current state of the physical plant, and at least one second term associated with health degradation of one or more components of the physical plant, the optimizer determining the performance solution that minimizes the sum of the first and second terms; the optimizer issuing control signals to at least the actuators to optimize behavior of the physical plant using the performance solution.

Additionally or alternatively, the first and second terms each comprise a weighting value.

Additionally or alternatively, the at least one second term is calculated in response to, and changes with, history of use of the actuators in the physical plant.

Additionally or alternatively, the method comprises the state observer tracking the history.

Additionally or alternatively, the method comprises a health monitor, operably coupled to the optimizer, tracking the history of use.

Additionally or alternatively, the optimizer uses an optimization-based control method, such as model predictive control (MPC).

Still another illustrative, non-limiting example takes the form of a method of operation in a configurable controller for controlling a physical plant having associated therewith a plurality of actuators for controlling operation of the physical plant and a plurality of sensors for observing a plurality of characteristics of the physical plant operations, the method comprising: a state observer capturing the current state of the physical plant; and an optimizer determining a performance solution for operation of the physical plant by: in a first stage, performing an optimization routine resulting in a first configuration of actuator settings directed to optimal performance in view of the current state of the physical plant; and in a second stage, defining a maximum deviation from optimal performance identified in the first stage, and identifying a second configuration of actuator settings that minimizes health degradation without causing performance to deviate by more than the maximum deviation from the optimal performance; and the optimizer issuing control signals to at least the actuators to implement the second configuration.

Additionally or alternatively, the maximum deviation is determined by reference to each of a plurality of sub-objectives of the performance optimization.

Additionally or alternatively, the maximum deviation is determined by reference to a total overall performance.

Additionally or alternatively, the optimizer performs the second stage by calculating one first term associated with optimized performance of the physical plant based on the current state of the physical plant, and at least one second term associated with health degradation of one or more components of the physical plant, and minimizing the sum of the first and second terms within the maximum deviation.

Additionally or alternatively, at least one second term is calculated in response to and changes with history of use of the physical plant.

Additionally or alternatively, the method further comprises the state observe tracking the history of use.

Additionally or alternatively, the method further comprises a health monitor tracking the history of use, wherein the optimizer is operably coupled to the health monitor to obtain or receive history of use data from the health monitor.

Additionally or alternatively, the method further includes the optimizer generating a plurality of outputs to control the plurality of actuators to operate the physical plant, wherein a first output of the plurality of outputs controls an actuator for a turbocharger waste gate (WG), and a second output of the plurality of outputs controls an actuator for a turbocharger recirculation valve (RCV), and the at least one second term comprises a WG term and an RCV term, and the configurable controller changes at least one of the WG term and RCV term in response to history of actuation of the WG and RCV.

Another illustrative, non-limiting example takes the form of a method of operation in a configurable controller for controlling a physical plant having associated therewith a plurality of actuators for controlling operation of the physical plant and a plurality of sensors for observing a plurality of characteristics of the physical plant operations, the method comprising: a state observer capturing the current state of the physical plant; and a low level controller controlling behavior of the physical plant using at least the actuators by using a plurality of control values for controlling behavior of the physical plant; a supervisory controller operably coupled to the state observer and the low level controller monitoring health effects of use of the physical plant as the low level controller controls behavior thereof; the supervisory controller identifying a health impact caused by the behavior of the physical plant and, in response thereto, the supervisory controller modifying one or more of the plurality of control values used by the low level controller, in order to reduce health impact; and the low level controller using the modified one or more of the plurality of control values to control the physical plant.

Additionally or alternatively, the low level controller uses an optimization-based control method, and the one or more control coefficients or weighting values are implemented in the optimization-based control method by the low level controller to control the physical plant.

Additionally or alternatively, the low level controller uses a setpoint-based control method, and at least one of the coefficients or weighting values is a setpoint implemented by the low level controller to control the physical plant.

Additionally or alternatively, the supervisory controller is configured with at least first and second sets of control values for use by the low level controller, and the method further comprises the supervisory controller operating by: for a first period of time, instructing the low level controller to implement the first set of control values, and observing a first health impact associated with the first set of control values; for a second period of time, instructing the low level controller to implement the second set of control values, and observing a second health impact associated with the second set of control values; determining which of the first and second health impacts is lesser; and for a third period of time occurring after the first and second periods of time, instructing the low level controller to use whichever of the first and second sets of control values has a lesser health impact.

Additionally or alternatively, the supervisory controller is configured with at least first and second sets of control values for use by the low level controller, and the method further comprises the supervisory controller operating by: instructing the low level controller to implement the first set of control values; observing a first health impact associated with the first set of control values; determining whether the first health impact exceeds a threshold; and upon the first health impact exceeding the threshold, instructing the low level controller to implement the second set of control values.

This overview is intended to provide an introduction to the subject matter of the present patent application. It is not intended to provide an exclusive or exhaustive explanation of the concepts. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 8-10 illustrate analysis of a two stage implementation at various inputs.

DETAILED DESCRIPTION

Figure 2:
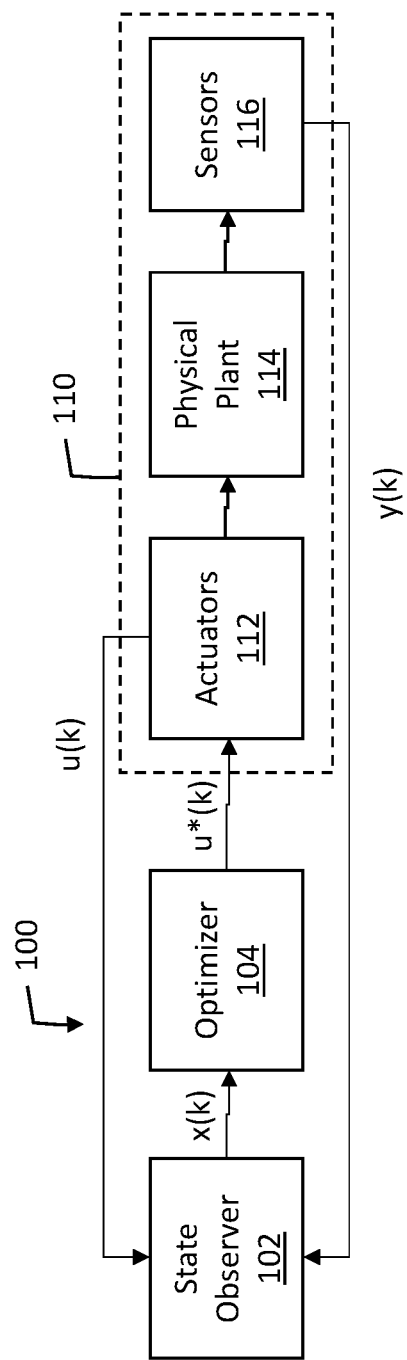
FIG. 2 shows a model of an operational control system.

FIG. 2 illustrates a general control architecture. A control apparatus is shown at 100 and includes a state observer 102, which feeds a set of current state variables x(k) to the optimizer 104. The optimizer calculates a solution for process parameters that can be applied to a set of actuators 112, which in turn control operation of the physical plant 114. The set of actuators may apply to control, for example and without limitation, fuel or other injectors, variable nozzle turbine position, throttle valve, engine brake, after-treatment (including exhaust), exhaust gas recirculation (EGR), turbocharger, an electric motor (in an electric turbocharger for example, which may be controlled via pulse width modulation (PWM)), the waste gate (WG) actuator position (stroke), position of the recirculation valve actuator, position of the variable compressor geometry actuator; and combinations thereof.

The physical plant 114 may be, for example and without limitation, an internal combustion engine, whether diesel or gasoline, or a subsystem thereof, such as a turbocharger, the system airpath as a whole, catalysts, etc. The present innovations may also be used more broadly in other systems outside of the engine or vehicle context, including, for example and without limitation, the management of clean room and/or more general ventilation systems, boilers, power plants, furnaces, and/or factory/manufacturing equipment and lines of such equipment, including for example an extruder or a fixture in a manufacturing line.

A plurality of sensors 116 are provided. Sensors 116 may include, for example, and without limitation, sensors detecting manifold absolute pressure (MAP), mass air flow (MAF), EGR flow, turbo speed, NOx, engine speed, fuel quantity, boost pressure, etc. Additional monitored parameters may include, for example, torque output of the electric motor of an electric turbocharger, waste gate (WG) normalized opening, recirculation valve (RCV) normalized opening, and/or a variable geometry compressor configuration. Such sensors may be configured to sample the underlying parameter being sensed and provide the result of such samples to the state observer 102. The state observer 102 may record the underlying sensed parameters, as well as actuator positions, over time to provide history of the system operation.

The state observer 102 and optimizer 104 may be, for example, implemented in a microcontroller configured to operate on a set of stored instructions for performing a state observation and optimization routine. In another example, an application specific integrated circuit (ASIC) may provide state observer functions, which can include the capture or accumulation of data from the actuators 112 and/or sensors 116, which in turn may be read periodically by a microcontroller configured with stored instruction sets for performing a control and/or optimization calculation using, for example, model predictive control (MPC) cost functions, linear quadratic regulator (LQR) control, proportional integral derivative (PID) control, or other control algorithms. The optimizer 104 may be integrated into, or provided separately from, an on-board diagnostics system (not shown) that can be used to record diagnostic variables and present them, as needed, to the user or to store for later analysis, both of which may additionally be integrated, if desired, into the overall vehicle processing unit.

The output of the analysis is used to control the actuators 112 to operate the plant in a manner to minimize the distance of operating parameters from one or more target output values for the controllable outputs or physical plant operating characteristics. For example, the targets may be any of target turbocharger speed, target boost pressure, target pressure difference over the compressor, target air mass flow or a combination thereof. For example, with MPC functions, the distance to target or reference values for the one or more output values (or resulting operating characteristics) is minimized, thus optimizing performance. As an example, a traditional MPC cost function formation may be as shown in Equation 1:

$$J_{MPC} = \min \sum\nolimits_{k=1}^{P} \|y_{r,k} - y_k\|_{W_1} + \|u_{d,k} - u_k\|_{W_1}, \qquad [\text{Eq. 1}]$$

Where $u_{d,k}$ corresponds to the desired profile for the manipulated variable, $u_k$ stands for the manipulated variable, k denotes discrete time instance, and P stands for the prediction horizon of the predictive controller. In this example, $y_{r,k}$ represents output reference values, and $y_k$ represents predicted values provided according to mathematical modelling of the physical plant to be controlled during the relevant time horizon, while and $W_1$ and $W_2$ specify weighting terms. For simplicity the k terms may be omitted in subsequent equations herein. The traditional MPC cost function is minimized in operation in order to provide optimal control to the physical plant. Such a process may be performed by the optimizer 104.

In another example, a PID controller can be used to account for each of proportional, integral, and derivative differences from a target operating point. The proportional difference may indicate current state, integral difference may identify a process shift over time, and derivative difference may indicate the direction of changes in operation. With PID control, a proportional difference is minimized while monitoring to ensure that the integral and derivative differences do not indicate changing performance which may, after further iterations, cause the proportional difference to increase. The control parameters output to the actuators 112 are, for a PID controller, adjusted to reduce or minimize the distance of actual performance from one or more targets on an iterative basis. The optimizer 104 may use PID control instead of MPC, for example. LQR control may be used instead, if desired, applying similar concepts.

Figure 3:
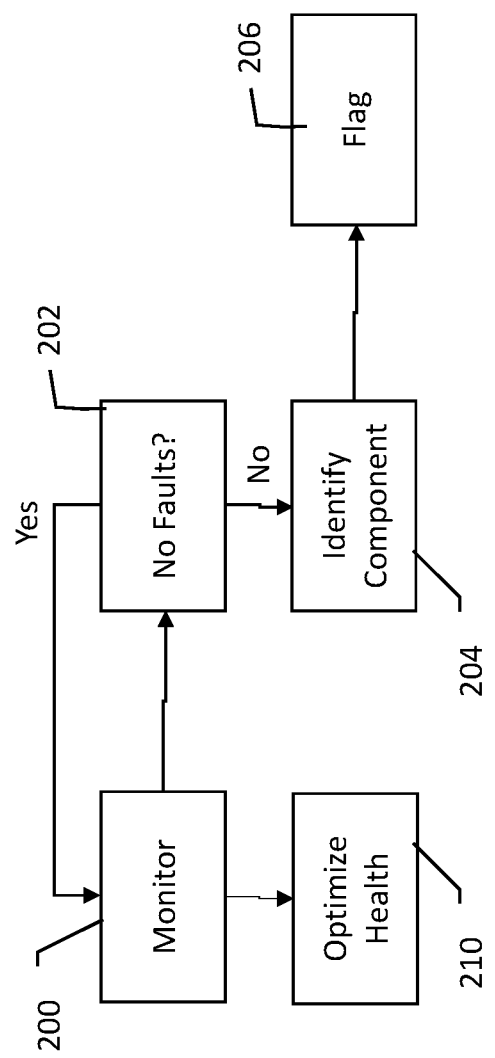
FIG. 3 is a block method flow diagram for an illustrative example.

FIG. 3 illustrates how health optimization may operate in coordination with traditional predictive maintenance. A set of health-related parameters can be monitored as indicated at 200, and used to check for satisfaction of faultless case conditions 202, with the process proceeding to component identification 204 and flag setting 206 as needed. In parallel, the monitored parameters (and others, as desired) are reused at 210 to optimize health of the underlying component. "Optimize health" in this context may mean controlling operations of the underlying component(s) to minimize health impacts. For example, a monitored pressure may be within safe bounds, but may be understood analytically as having both "safe" and "healthy" operating parameters, with the "healthy" operating parameter more limited than the "safe" operating parameter. For another example, each time certain actuators are used to move something (a valve, for example), this may count toward the rated life of the actuated thing; that is, a given valve may be rated for operation of 10,000 cycles, thus each cycle of operation may count toward the deterioration of health of that valve. Block 210 may be used to adjust the operations of the optimizer in one or more ways.

Figure 1:
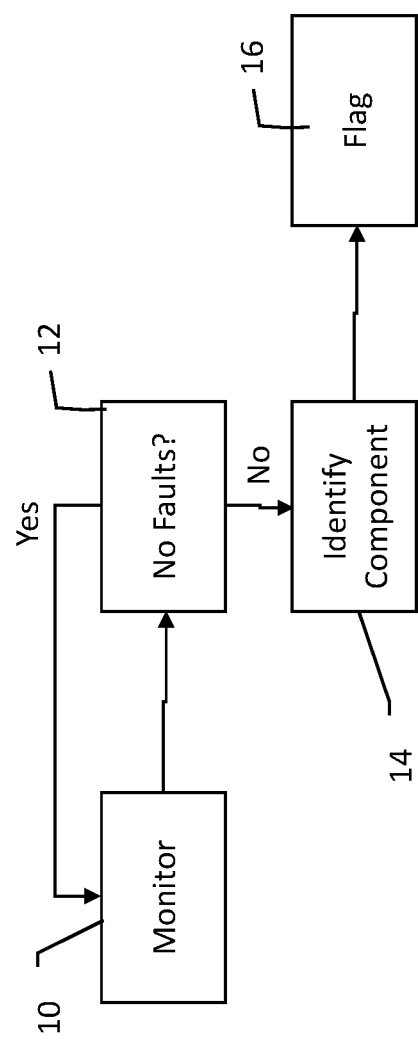
FIG. 1 is a block method flow diagram of prior art predictive maintenance.

The monitored parameters from block 210 (and/or other information, such as history of use, user inputs, environmental information, etc.) may be used in the illustration of FIG. 1 as well. In particular, operations in the optimizer 104, in some examples, are adjusted to further account for system health. In some examples, the optimizer calculations are modified to add factors related to system health. In other examples, target values used within optimizer calculations are shifted in response to monitored system health conditions. Some examples perform a two stage analysis by first determining an optimal performance solution, defining a maximum allowed deviation from the optimal performance solution, and then introducing factors related to system health into a second calculation of optimal performance/health, wherein the result minimizes impact to system health within the maximum allowed deviation. "System health" may refer here to the current state of components of a system, as well as the likelihood that certain settings can affect component health by accelerating aging of components or otherwise causing damage, whether near term or long term, to components.

In the turbocharger context, system and component health degradation may result from, for example and without limitation, fouling of components, aging, mechanical wear of the wastegate (WG), and cycle fatigue damage (high or low) to the compressor wheel, for example. Of these, WG mechanical wear and low cycle fatigue (LCF) may in particular be the focus of preventable health degradation efforts. In some examples, system health management is focused on WG and LCF issues. However, other system health factors and components may be accounted for as well.

Figure 4:
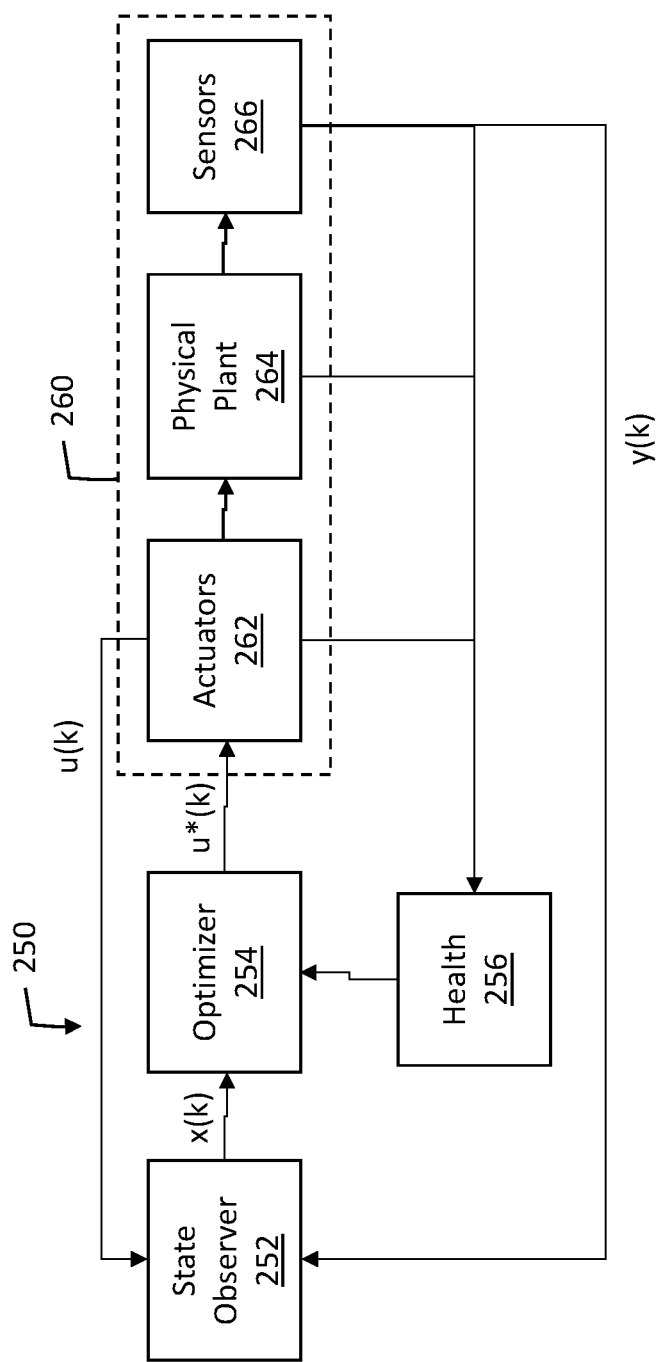
FIG. 4 shows another model of an operational control system.

Turning now to FIG. 4, the control system shown in FIG. 2 is shown again, with a state observer 252, optimizer 254, actuators 262, physical plant 264 and sensors 266 as before. A separate health monitor block is also included now at 256, configured to receive information from the sensors 266, physical plant 264, and/or actuators 262. The information from the physical plant 264 and/or actuators 262 may include, for example and without limitation, an indication of current state (for example, whether and to what extent a valve is open), though such information from the actuators may instead or in addition be obtained by monitoring control signals from the optimizer 254 to the physical plant 264.

Block 256 is shown for illustrative purposes but may be understood as being integrated into the optimizer 254. The operations of blocks 252, 254 and 256 may be implemented in a microcontroller configured to operate on a set of stored instructions for performing a state observation, health management and optimization routine. In another example, an application specific integrated circuit (ASIC) may provide state observer 252 and/or health monitor block 256 functions, which can include the capture or accumulation of data from the actuators 262 and/or sensors 266, which in turn may be read periodically (or in response to predefined events) by a microcontroller configured with stored instruction sets for performing an optimization calculation using, for example, MPC cost functions, LQR control, PID control, or other control approaches.

In operation, one approach to implementing system health optimization may be directed to replacing the use of one actuator with another to reduce wear on one or more actuators. For example, rather than relying on waste gate (WG) function to control the force applied to the turbine by exhaust gasses, to account for conditions in the compressor, eTurbo functions may be modified (as used herein, eTurbo refers to a system having an electric drive actuator that is operable to provide power to the turbocharger compressor when exhaust pressures are relatively low due to low engine speed (RPM)), or the recirculation valve (RCV) may be used to avoid making changes to WG operation for operation purposes. To achieve this, using WG as a non-limiting example, weighting factors related to the use of the WG function—specifically to changes in actuator position for the WG—may be included as health factors in the optimization calculation, or in a post-processing health optimization of a performance optimization calculation.

In an example, the health monitor block 256 may be used to change the optimization calculation in favor of using the RCV to manipulate boost pressure, rather than opening the WG, when aggressive driving (and thus aggressive changes to throttle valve position) is anticipated. For example, in typical use of the RCV, boundary limits to boost pressure are addressed by the RCV to prevent damage and/or to avoid surge. In contrast, when operating with the health monitor block 256, the RCV may be used proactively to reduce WG actuator operation even when boost pressure conditions would not otherwise trigger RCV bypass. Thus when the input demands from the user indicate a change in throttle position that would limit input gas flow to the compressor, the RCV is triggered first, rather than the WG, to avoid surge. In an example, such usage would be tracked by the system (such as by the health monitor block 256, the state observer 252, or in the optimizer 254, or by a microcontroller, microprocessor, or ASIC embodying one or more of these blocks), and the determination of which of the RCV or WG to use may change over time depending on which actuator receives more use. For example, if the RCV is rated for a number of cycles, N, and the WG is rated for a number of cycles, M, the control system may adjust factors related to the health impact of use of one or the other in view of how many cycles each has been subjected to since first use, as well as with consideration of the typical usage pattern of the system. For example, one or more factors of a cost minimizing function (such as MPC) may include actuator health factors related to each actuator, where the actuator health factors include coefficients that change by increasing as the number of cycles of use of such actuator (or other feature, such as a rechargeable battery), whether in linear, stepwise, or polynomial fashion.

In some examples, the configuration in FIG. 4 may be understood as including a low level controller (the optimizer 254) and a supervisory controller (health monitor block 256), in which the supervisory controller is configured to monitor ongoing operations and impacts to system and/or system component health. The supervisory controller may use a very long time horizon, such as by reference to a maintenance schedule timeframe, for example (months or years, depending on the implementation), for making determinations about next steps, while the low level controller is adapted for decision making using a shorter time horizon (such as a cycle or trip, typically on the order of minutes to hours, though possibly longer). Using the example above of replacing WG use with RCV use, the low level controller (the optimizer 254) may perform an MPC function using one or more cost function inputs, for example coefficients and weighting factors. The supervisory controller can act to modify one or more cost function inputs, such as by changing a coefficient or weighting factor, to favor or disfavor certain operations such as actuation or change in position of the WG and/or RCV. In some examples, the supervisory controller may modify a cost function itself, such as by changing a cost function from a linear function to a quadratic or exponential function, for example. In another example, the low level controller may be a non-optimizing controller such as a PID controller instead, and the supervisory controller can operate on the low level controller activity by, again, modifying an input value such as a setpoint.

In another example, the system includes an eTurbo apparatus. Some examples of design for and use of an eTurbo are shown in US PG Pat. Pub. No. 2009/0000298 and U.S. Pat. No. 6,637,205. In context, one use of eTurbo may be to avoid closing and opening valves (RCV and/or WG) when the engine is being used in a widely varying manner, as may happen as the user aggressively accelerates a vehicle from stop to highway speed, for example. The WG can be opened and the RCV remains closed, while the eTurbo tracks user demand to control compressor operation, providing air pressure to the engine while the throttle is open and ceasing to drive the compressor when the throttle is closed, for example; on reaching a selected gear, or a selected vehicle speed, the WG can be closed and ordinary operation of the turbocharger enabled. Having multiple actuators at one's disposal (not only the WG, but also the e-motor), their health degradation can be distributed more evenly preventing, for example, the WG from being repeatedly actuated, shortening WG actuator life.

For another example, again using eTurbo, the electric motor may be powered by a battery that can be charged to store the recuperated energy that would otherwise be lost when slowing down the eTurbo. From a power efficiency perspective, it may appear most efficient to recharge the battery whenever decreasing the eTurbo speed to maximize energy recovery. However, rechargeable batteries are generally rated for certain number of cycles, and short up- and down-charging cycles might accelerate battery degradation. To preserve battery health, it may be sensible, given particular driving/use conditions, to avoid charging when power draw and/or throttle position is highly variable, thus foregoing energy recovery in order to preserve battery longevity.

In another example, health degradation of the battery might depend on its internal temperature. One aim may be to limit charging or discharging of the battery when the battery temperature is not in a "healthy" range. While it may be possible to simply bar such use of the battery when outside of the healthy range, in some examples, the use of the battery outside the healthy temperature is incorporated into an optimization routine as a cost function having a zero value when battery internal temperature is in a healthy range, and a non-zero value otherwise.

In another example, an autonomous or self-driving vehicle may have separately actuated front- and rear-wheel brakes. With health-conscious controller taking not only the braking effect, safety and maneuverability but also the brakes degradation into account, the braking force might be distributed more evenly among the front and rear brakes. For example, in some situations (e.g. when approaching a stop sign), the controller might start braking slightly earlier using the rear brakes more, relieving the front brakes a little bit. In that case, earlier braking allows to accommodate for lower rear brakes efficiency. In that case, safety is maintained, but degradation of the front brakes is lower. Again, to implement the feature, the use of front and/or rear braking may each be added to the cost calculation when optimizing performance and health solutions.

For implementation purposes, the weighting of health indicators may be modified, or the health indicators themselves may be modified, for select vehicle conditions, such as when a vehicle is stopped or moving at low speed. Thus one or more coefficients or weighting factors may operate as a function of ambient or system conditions, such as humidity, temperature, air pressure, O2, airspeed, etc.

The following examples show how these changes can be implemented in several embodiments. In a first approach, an MPC method is used for optimizing performance after taking into account health indicators, the impact of which is incorporated as shown here in Equation 2:

$$\min J_{HCMPC,1} = \min(w_1 J_{MPC,T} - w_2 \Sigma HI_k) \quad [\text{Eq. 2}]$$

Where $J_{MPC,T}$ represents the traditional MPC criterion for the physical plant from Equation 1, excluding health indicators, $HI_k$ represents a health indicator which decreases as health degrades, and $w_1$ and $w_2$ are weighting factors determining relative performance and health indicator weights. As an example, $HI_k$ may represent WG health. When no change to the WG actuator is called for within the time horizon of the optimized solution, $HI_k$ may be static. If there is a change to the WG actuator position called for in the optimized solution, $J_{MPC,T}$, the change to $HI_k$ that results from the change in WG actuator position can be reflected by reducing $HI_k$ allowing the approach in Equation 3 to factor in the health cost of this particular action. Using the WG example, $HI_k$ may represent the remaining fraction of the number of actuation cycles for which the WG is rated. Thus, as $HI_k$ drops, the equation as shown increases the argument, adding cost to account for health impact.

$HI_k$ may be a composite of health indicators for a plurality of component health factors, or may be a stand-alone indicator for a single component. In some examples, more than one $HI_k$ factor may be included for each of several health impacts, such as by having a first term for WG, a second term for EGR valve, and a third term for a change in compressor speed, for example, each with a separate weighting factor. In other examples, Equation 2 may be modified to account for multiple health factors by nesting a summation inside the $HI_k$ term to account for all considered health impacts. Individual health impacts within $HI_k$ term may be further weighted, as by having a separate weighting for compressor impacts relative to EGR impacts, since replacing an EGR is potentially cheaper and simpler than replacing the compressor.

An alternative formulation is shown in Equation 3:

$$\min J_{HCMPC,2} = \min(w_1 J_{MPC,T} + w_2 \Sigma \Delta HI_k) \quad [\text{Eq. 3}]$$

Where $\Delta HI_k = HI_{k-1} - HI_k$ is an indication of the health indicator degradation that results from steps that occur in the time horizon of the calculation. Using WG as the example, the delta from time instance k−1 to time instance k may reflect a change in the remaining fraction of actuation cycles for which the WG is rated. The other terms are as in Equation 2. Equation 2 thus represents a health state maximizing MPC approach, while Equation 3 represents a health degradation minimizing MPC approach.

A controlled health degradation approach may instead use a slack variable to manage health indicator degradation. Equation 4 is illustrative:

$$\min J_{HCMPC,3} = \min(w_1 J_{MPC,T} + w_2 \Sigma s_{HI,k}) \quad [\text{Eq. 4}]$$

Here, the MPC criterion (excluding health factors) can be calculated alongside a slack variable, and the weighted sum minimized. The slack variable can be determined with Equation 5:

$$s_{HI,k} = \Delta HI_k - \overline{\Delta HI_k} \quad [\text{Eq. 5}]$$

Where $\overline{\Delta HI}_k$ is a maximum allowed health degradation factor, which can be determined using historical data or may be defined as a percentage decrease from nominal. The slack variable may be bounded by zero at the low end.

In another example, a two stage approach is used to limit performance degradation while also accounting for health degradation. In this example, a performance optimizing solution is determined in the first stage, and adjustments are made in a second stage to reduce health degradation with limited performance degradation. The nominal performance solution may be, for example and without intending limitation to MPC, using Equation 1. Here, any of formulas 2-4 may be operated after a nominal performance solution is achieved, while applying Equation 6 to limit performance degradation:

$$J_{HMPC} - J_{MPC,0} \leq \Delta J \qquad [\text{Eq. 6}]$$

Where $\Delta J$ defines a maximum performance degradation that the health degradation optimization is allowed to impart. Thus, the updated solution of $J_{HMPC}$ is limited by a maximum degradation to the optimized solution.

Figure 5:
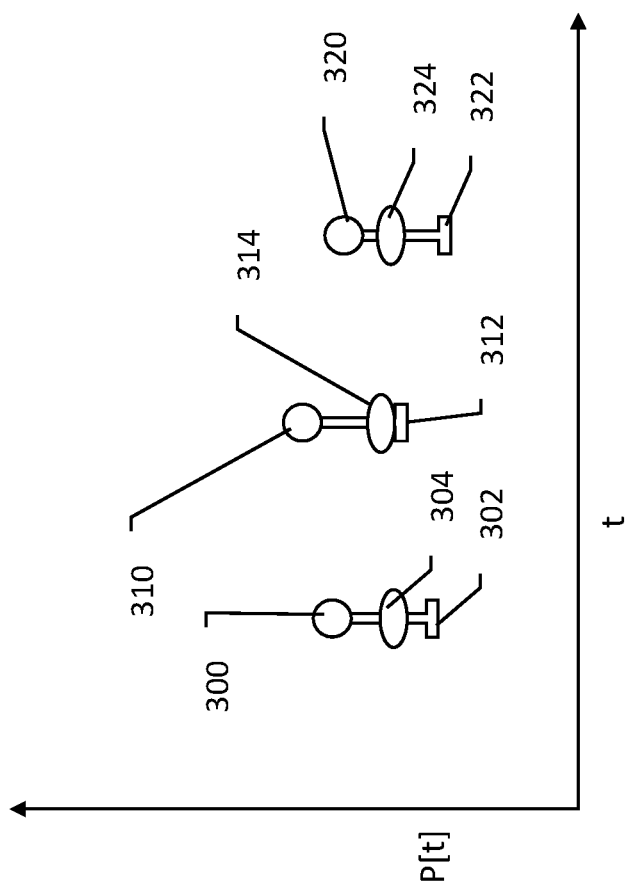
FIG. 5 illustrates in graphic form a health optimizing manipulation.

FIG. 5 is illustrative of the two-stage approach. The x-axis is time and the y-axis is modeled or predicted performance at a given time/iteration in FIG. 4. At each of several iterations of the control process, user inputs and physical plant state information are used to determine optimized solutions using, for example, MPC, PID, LQR, or other control processes. The optimized solutions are shown at points 300, 310, 320, indicating the optimized performance P(t) for each iteration. Points 300, 310, 320 represent the output of the first stage of the method. Relative to each solution 300, 310, 320, the second stage of the method determines a maximum degradation of performance, indicated at 302, 312, 322. The second stage of the operation then determines a performance and health optimized solution, shown at 304, 314, 324, which is bounded between the performance optimized solution 300, 310, 320 and the maximum degradation for each optimized solution 302, 312, 322.

The two stage approach illustrated by FIG. 5 may be performed either as an overall cost calculation relating to general performance of the physical plant, or individual elements of the general performance may be analyzed separately in separate cost function analyses. For example, the cost function may be calculated using each of several performance metrics (targets may be any of consumed fuel/energy source, target turbocharger speed, target boost pressure, target pressure difference over the compressor, or target air mass flow, for example) summed together in one cost function, or two or more such targets can be analyzed separately. In one example, the first stage provides an optimized solution across all performance targets, and the second stage is performed individually for each performance target. In still another example each of the first and second stages are performed individually for each performance target.

In another example, a bilevel control is implemented using a low level controller that implements a performance target control method on an ongoing basis to determine optimized (performance only or health and performance) solutions for the physical plant. Also operating in the bilevel control is a supervisory controller that monitors for health impacts and is allowed to modify elements of the low level controller analysis.

For example, the supervisory controller can manipulate parameters of a low level controller using a longer time horizon. Assuming a low level controller using MPC, the supervisory controller can manipulate tuning parameters or weights within the cost function applied by the MPC controller to achieve a long term performance/health goal. Assuming a low level controller using PID control, the supervisory controller may be configured to modify setpoints or other control parameters or weights used by the PID control to reduce health impacts or otherwise optimize system health.

For example, the supervisory controller may command the low level controller to use a first set of control parameters or control values for a first period of time, and to determine if the health impact of using the first set of control values is acceptable, such as by comparison to a threshold health impact (or health cost). If the first set of control values yields health impacts that are out of range, as analyzed by the supervisory controller, the supervisory controller instructs the low level controller to apply a second set of control values to preferably reduce health impact. After instructing use of the second set of control values, the supervisory controller may continue to monitor operation to determine whether the change to the second set of control values achieves lower health impact. The supervisory controller may also determine how much performance deterioration is experienced by the switch from the first set to the second set of control values to ensure deviation of performance is limited.

In another example, which is more exploratory in nature, the supervisory controller may apply a plurality of sets of control values over time and observe performance and health impacts of the different parameter sets to select a "best" set of parameters in view of the performance and health impacts. The sets of parameters may be pre-scripted according to an overarching model of health and performance, if desired. For example, the supervisory controller may instruct the low level controller to use a first set of control values for a first period of time with the supervisory controller monitoring health impacts to associate a first health impact with the first set of control values. Next, the supervisory controller may instruct the low level controller to use a second set of control values for a second period of time, with the supervisory controller monitoring health impact to associate a second health impact with the second set of control values. The supervisory controller can then select whichever of the first or second sets of control values (or third or fourth, as the method or system may apply more than two control value sets) causes lesser health impact, and instructs the low level controller to use the selected set of control values.

Figure 6:
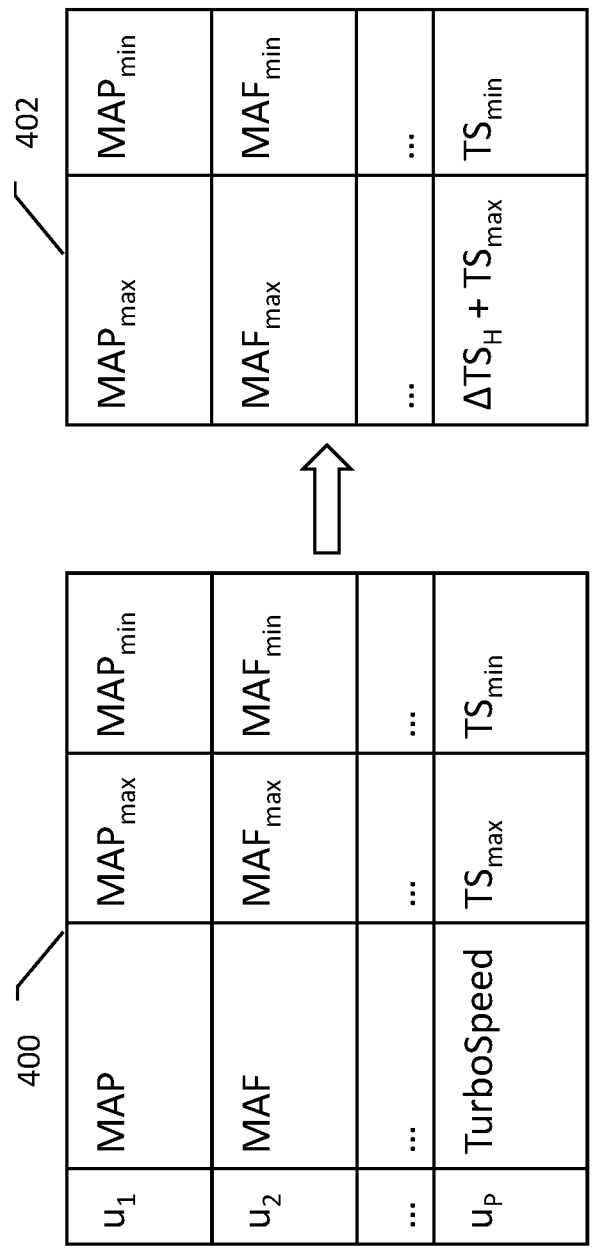
FIGS. 6-7 illustrate manipulation of control boundaries and targets for health optimization.

In an example, rather than manipulating the optimization calculations by changing the cost function with additional terms, the terms within the optimization calculation may be changed. Thus and for example, using Equation 1, there are a number of monitored variables each having maximum and/or minimum values, stored as a mapping function as shown in FIG. 6. An original set of these maximum and minimum values can be stored as shown at 400. During utilization of the system, it may be determined that a change in one of more variables to reduce health impacts is advisable if, for example, the cumulative effect of use is deemed to be approaching a limit, or if in the context of use, certain conditions create a need to reduce performance optimization to avoid health impacts. So, for example, in FIG. 5, in the automotive context, if the turbo speed maximum is used in a pattern that creates a potential health degradation, the system can automatically change the turbo speed maximum value, creating a new mapping as shown at 402, where $\Delta TS_H$ is added (noting the value may be negative) to the maximum turbo speed to adjust this boundary and reduce health impacts. Such a modification can take place after the system has been in use.

Figure 7:
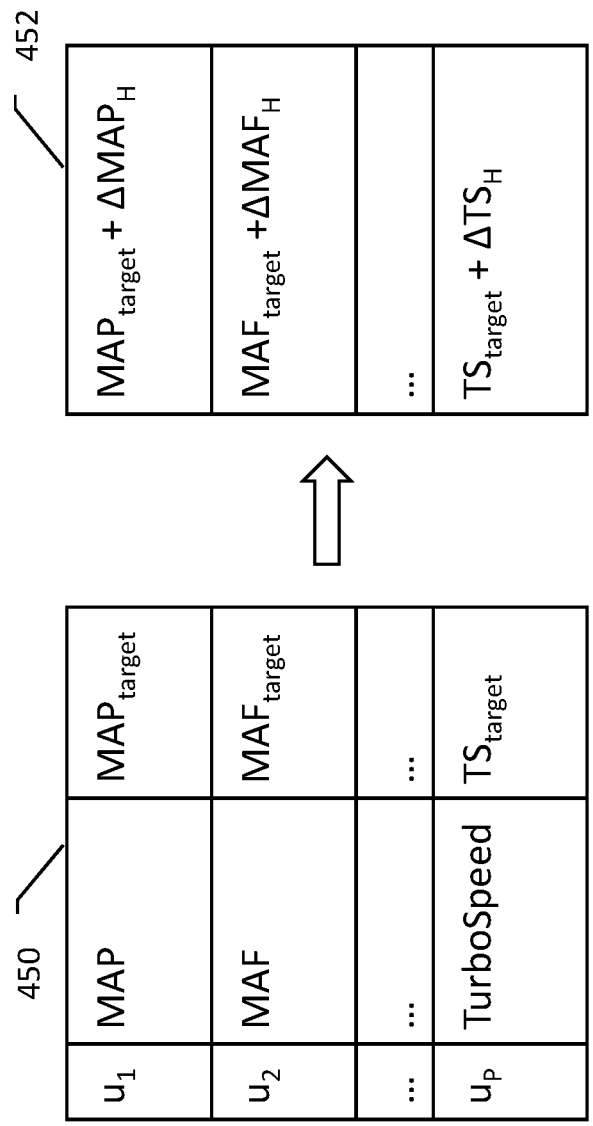

FIG. 7 shows another example of remapping control variables by a supervisory controller. Here, the target values for optimized operation may be stored in a mapping at 450. As information about the user's tendencies is learned over time, and the impact of those tendencies is analyzed, one or more adjustments to the target variables can be made, regenerating the map as indicated at 452.

In some examples, a time horizon of system health considerations may be longer than the time horizon of process controls, if desired. For example, optimization of control settings for performance purposes may be directed to a relatively short time frame, such as the duration of a trip (in the automotive context), which may be determined using historical usage patterns of a vehicle, while health setting time horizons are more likely to look to longer term periods, such as months or years before certain maintenance activities are required. The system health considerations may, in some examples, adjust to account for cumulative effects of previous use. Such considerations can be used in the examples of FIGS. 6-7 to adjust the boundaries and targets within the optimization calculation, with or without additionally adding terms to the optimization calculations (Equations 2-4) or using a two stage approach (FIG. 5).

Bilevel control and two stage control may be used together. The low level controller and supervisory controller architecture is introduced above in FIG. 4, with the optimizer 254 serving as an example of a low level controller, and the health monitoring block 256 as a supervisory controller. In some examples, the low level controller performs two stage control using for example the approach outlined relative to Equation 6, and the supervisory controller is configured to modify any of the factors used in the low level controller, including factors related to performance optimization as well as factors related to health optimization, and/or the maximum performance degradation, as needed.

In an example, the supervisory controller may observe whether the user inputs change in response to performance degradation and operates in response. For example, in the automotive context, if a driver becomes more aggressive in the use of accelerator and/or braking under conditions where the health optimization is reducing performance optimization, the maximum performance degradation factor may be reduced, to determine whether the driver becomes less aggressive. "Aggressive" in this context may be determined by observing the quantity and severity of changes to accelerator and/or brake actuations by the user. If the driver is observed to be more aggressive when performance degradation is at its maximum, it may be determined that the driver is dissatisfied with performance under such conditions, and the maximum degradation of performance used in Equation 7 may be reduced. The converse may also be the base; if the driver usage of accelerator and/or braking inputs is not observed to change when health factors cause performance degradation, the supervisory controller may allow for more performance degradation until the driver is observed to react.

In some examples, an off-line analysis may be used to drive the changes shown in FIGS. 6-7. For example, some systems may incorporate extremum-based control (ESC). With extremum seeking control frameworks, the aim is to perturb a steady state operating system by the assumption that performance of the system is stable across the range of inputs. The analysis may be performed off-line, and may be used to aid in determining, for example, weighting factors to use in the above description. By varying inputs, ESC can identify extreme operating points. In some examples, similar to Equations 2 and 3, above, the ESC control scheme can be modified to incorporate health indicators to maximize health state (as in Equation 2, above), or to minimize health degradation (as in Equation 3, above). In a further example, ESC can be modified to incorporate a slack variable (as shown in Equation 4, above).

It can be mathematically shown that each of these solutions can be used to improve operations, while in some contexts the two-stage approach may be better at achieving optimized performance and decreased health impact. Taking, for example, a simple system having one output Y, one actuator A, and an uncontrolled disturbance D, that interacts with the system according to {Y=A−D}. Assuming no constraints on the actuator, A, a nominal MPC approach would use the cost criterion of Equation 7:

$$J_{MPC}=(R-Y)^2 \qquad [\text{Eq. 7}]$$

Where R stands for the output reference (target) value. One may further assume that a health degradation factor for the actuator may be expressed as:

$$\{HD=A^2\} \qquad [\text{Eq. 8}]$$

Using the above example of integrating the health cost into the optimization function, Equation 9 is representative of the resulting MPC function:

$$J_{HC}=J_{MPC}+HD=(R-Y)^2+A^2 \qquad [\text{Eq. 9}]$$

Where $J_{HC}$ represents the health conscious MPC cost function.

Using the same inputs, a two stage approach may be defined instead where the nominal cost function optimized in the first stage yields a (health indifferent) actuator value A*, giving Equation 10 as the nominal optimized criterion:

$$J_{MPC}(A^*)=J^*_{MPC} \qquad [\text{Eq. 10}]$$

Then, the second stage can be defined as a minimization of the health degradation factor for the actuator expressed in Equation 8, with respect to performance degradation constraints given by Equation 10. The second stage analysis can be defined then using Equation 11:

$$J_{MPC}(A) \le J^*_{MPC}+\Delta J \qquad [\text{Eq. 11}]$$

In which $\Delta J$ is the user defined, positive allowable performance degradation. To then analyze how these two approaches may be compared, it should be understood first that the minimum value for these cost functions can be identified when the derivative of either is zero. The minimum point for the formulation in Equation 8 may be determined as follows in Derivation 1:

$$J_{HC} =$$
$$(R-Y)^2 + A^2 = (R-A+D)^2 + A^2 = 2A^2 - 2A(R+D) + R^2 + 2RD + D^2$$
$$\frac{dJ_{HC}}{dA} = 4A - 2(R+D)$$
$$\frac{dJ_{HC}}{dA} = 0 \to 4A - 2(R+D) = 0 \to A_1^* = \frac{R+D}{2}$$

Where $A^*_1$ would denote the actuator value that minimizes the health conscious MPC cost function $J_{HC}$.

Starting with the non-health conscious optimization (stage 1 of the two-stage procedure), Derivation 2 is helpful in the basic understanding:

$$J_{MPC} = (R - Y)^2 = (R - A + D)^2 = A^2 - 2A(R + D) + R^2 + 2RD + D^2$$

$$\frac{dJ_{MPC}}{dA} = 2A - 2(R + D)$$

$$\frac{dJ_{MPC}}{dA} = 0 \rightarrow 2A - 2(R + D) = 0 \rightarrow A^*_{2,I} = R + D$$

Here, $A^*_{2,I}$ denotes the actuator value minimizing $J_{MPC}$. The optimal cost function value for the first stage of the two-stage approach is then calculated using Equation 12:

$$J^*_{MPC}=(A^*_{2,I})^2-2A^*_{2,I}(R+D)+R^2+2RD+D^2 \quad \text{[Eq. 12]}$$

Substituting the result of Derivation 2, into Equation 12, if no actuator constraints are assumed, and only reference tracking error is minimized, the effect of a disturbance can be eliminated, yielding a zero cost function value, as shown in Equation 13:

$$J^*_{MPC}=(R+D)^2-2(R+D)(R+D)+R^2+2RD+D^2=0 \quad \text{[Eq. 13]}$$

Then adding a constraint by including the ΔJ term, Derivation 3 provides a simplified result:

$$J_{MPC}(A) \leq J^*_{MPC}+\Delta J \rightarrow A^2-2A(R+D)+(R+D)^2 \leq J^*_{MPC}+$$
$$\Delta J \rightarrow (A-(R+D))^2 \leq J^*_{MPC}+\Delta J \rightarrow R+D-$$
$$\sqrt{J^*_{MPC}+\Delta J} \leq A \leq R+D+\sqrt{J^*_{MPC}+\Delta J}$$

Here, A is then bounded between these two values, for the second stage of the two stage approach. The value $A^*_{2,II}$ being the minimum of the cost function for the second stage of the two-stage approach and the outcome of the whole two-stage procedure can be summarized within these three formulae in Formula Set 1:

$$A^*_{2,II}=0 \text{ if } R+D-\sqrt{J^*_{MPC}+\Delta J} \leq 0 \leq R+D+\sqrt{J^*_{MPC}+\Delta J}$$

$$A^*_{2,II}=R+D-\sqrt{J^*_{MPC}+\Delta J} \text{ if } R+D-\sqrt{J^*_{MPC}+\Delta J}>0 \quad \text{b.}$$

$$A^*_{2,II}=R+D+\sqrt{J^*_{MPC}+\Delta J} \text{ if } R+D+\sqrt{J^*_{MPC}+\Delta J}<0 \quad \text{c.}$$

To use the above for analysis of the two approaches, one may assume, without losing generality, that R=5. Several examples of a disturbance, D, can then be analyzed to compare the results using a health optimized MPC function versus the two stage controller approach. For purposes of the analysis, ΔJ is set here as 12.25.

In a first example, the disturbance D=2. FIG. 8 shows how this disturbance affects operation under each of the two control methods. Applying the above formulas and equations, the health conscious controller analysis at 500 provides the same result as the two stage controller analysis at 502, both yielding a health degradation factor of 12.25.

In a second example, the disturbance D=−7. FIG. 9 shows how this disturbance affects operation under each of the two control methods. Applying the above formulas and equations, the health conscious controller analysis at 510 provides a different outcome than the two-stage controller shown at 512. Here, the health conscious controller minimizes the cost function to 1 and yields a health degradation of 1, while the two stage approach minimizes the performance cost function to 4 and a health degradation of 0. This means that performance would be affected more in the two stage approach, though within the user-defined limitation on performance degradation, while health degradation would be driven to zero.

In a third example, the disturbance D=−20. FIG. 10 shows how this disturbance affects operation under each of the two control methods. Applying the above formulas and equations, the health conscious controller analysis at 520 provides a different outcome than the two stage controller shown at 522. Here, the health conscious controller minimizes the cost function to 56.25 and yields a health degradation of 56.25, while the two stage approach minimizes the performance cost criterion to 12.25 and provides a health degradation of 132.25. This means that performance degradation is more limited by the two stage approach, due to the user-defined limitation on performance degradation, though the health degradation cost is higher than when using a single stage controller.

As shown in the examples in FIGS. 8-10, a two stage approach may be desirable to balance health and performance impacts. Such behavior may be desired in applications where a user wants to control and limit performance degradation caused by health state optimization. For example, applications having safety constraints not otherwise considered in the cost function, or applications with significant potential economic effects.

The above detailed description includes references to the accompanying drawings, which form a part of the detailed description. The drawings show, by way of illustration, specific embodiments. These embodiments are also referred to herein as "examples." In this document, the terms "a" or "an" are used, as is common in patent documents, to include one or more than one, independent of any other instances or usages of "at least one" or "one or more." Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Some examples can include elements in addition to those shown or described. The present inventors also contemplate examples using any combination or permutation of those elements shown or described (or one or more aspects thereof), either with respect to a particular example (or one or more aspects thereof), or with respect to other examples (or one or more aspects thereof) shown or described herein.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim.

Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of protection should be determined with reference to the appended claims, along with the full scope of equivalents to which such claims are entitled.

What is claimed is:

1. A configurable controller for controlling a physical plant having associated therewith a plurality of actuators for controlling an operation of the physical plant and a plurality of sensors for observing a plurality of characteristics of the operation of the physical plant, the configurable controller comprising:
   a state observer configured to capture a current state of the physical plant by communication with the plurality of sensors; and
   an optimizer configured to optimize behavior of the physical plant using at least the actuators;
   wherein the optimizer is configured to operate using at least one first term associated with optimized performance of the physical plant based on the current state of the physical plant, and at least one second term associated with health degradation of one or more components of the physical plant, and the optimizer determines parameters to use in the actuators by calculating a weighted sum of the at least one first term and the at least one second term, and minimizing the weighted sum of the at least one first term and the at least one second term.

2. The configurable controller of claim 1, wherein the at least one second term is calculated in response to, and changes with, a history of use of the actuators in the physical plant.

3. The configurable controller of claim 2, wherein the history of use is tracked by the state observer.

4. The configurable controller of claim 2, wherein the history of use is tracked by a health monitor, and the health monitor is operably coupled to the optimizer.

5. The configurable controller of claim 1, wherein the optimizer generates a plurality of outputs to control the plurality of actuators to operate the physical plant.

6. The configurable controller of claim 1, wherein the optimizer is configured to use an optimization-based control method.

7. A method of operation in a configurable controller for controlling a physical plant having associated therewith a plurality of actuators for controlling operation of the physical plant and a plurality of sensors for observing a plurality of characteristics of the operation of the physical plant, the configurable controller including a state observer and an optimizer, the method comprising:
   the state observer capturing a current state of the physical plant by communication with the plurality of sensors; and
   the optimizer controlling behavior of the physical plant by issuing a plurality of control signals to the actuators, by using at least one first term associated with optimized performance of the physical plant based on the current state of the physical plant, and at least one second term associated with health degradation of one or more components of the physical plant, and the optimizer determines the control signals based on a control solution determined by minimizing the sum of the first term and the second term.

8. The method of claim 7, wherein the optimizer is configured to calculate the at least one second term in response to, and changing with, a history of use of the actuators in the physical plant.

9. The method of claim 8, further comprising the state observer tracking the history of use.

10. The method of claim 8, wherein the configurable controller further comprises a health monitor, and the method includes the health monitor tracking the history of use.

* * * * *